US012392982B2

(12) United States Patent
Tachibana et al.

(10) Patent No.: US 12,392,982 B2
(45) Date of Patent: Aug. 19, 2025

(54) INFRARED LENS UNIT AND INFRARED DETECTION DEVICE

(71) Applicant: Panasonic Intellectual Property Management Co., Ltd., Osaka (JP)

(72) Inventors: Minoru Tachibana, Osaka (JP); Ryo Haseyama, Osaka (JP); Jun Murata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 132 days.

(21) Appl. No.: 18/249,410

(22) PCT Filed: Nov. 19, 2021

(86) PCT No.: PCT/JP2021/042680
§ 371 (c)(1),
(2) Date: Apr. 18, 2023

(87) PCT Pub. No.: WO2022/185628
PCT Pub. Date: Sep. 9, 2022

(65) Prior Publication Data
US 2023/0393363 A1    Dec. 7, 2023

(30) Foreign Application Priority Data

Mar. 4, 2021  (JP) .................. 2021-034056

(51) Int. Cl.
*G02B 7/02* (2021.01)
*G01J 5/08* (2022.01)
*G02B 3/04* (2006.01)

(52) U.S. Cl.
CPC .................. *G02B 7/02* (2013.01); *G01J 5/08* (2013.01); *G02B 3/04* (2013.01)

(58) Field of Classification Search
CPC ................ G02B 7/02; G02B 3/04; G01J 5/08
See application file for complete search history.

(56) References Cited

U.S. PATENT DOCUMENTS

| 2006/0166407 A1* | 7/2006 | Kaushal ............... G01J 5/0806 438/115 |
| 2012/0019905 A1* | 1/2012 | Teraoka ................ G02B 7/021 359/356 |

(Continued)

FOREIGN PATENT DOCUMENTS

| JP | 2010-156905 | 7/2010 |
| JP | 2013-195795 | 9/2013 |

(Continued)

OTHER PUBLICATIONS

International Search Report of PCT application No. PCT/JP2021/042680 dated Jan. 11, 2022.

*Primary Examiner* — Hugh Maupin
(74) *Attorney, Agent, or Firm* — Rimon P.C.

(57) ABSTRACT

An infrared lens unit includes a lens barrel and an infrared lens supported on the lens barrel. The lens barrel includes a tubular part extending along a central axis extending in upward and downward directions and having an inner circumferential surface surrounding the central axis and a through-hole therein demarcated by the inner circumferential surface, and a protruding part disposed on the inner circumferential surface of the tubular part. The infrared lens is supported by the tubular part via the protruding part. The infrared lens is made of chalcogenide glass. The protruding part includes, in a cross section of the protruding part on a plane on which the central axis extends a linear portion extending in an upward direction from its lower end to its upper end and a sloping portion including an upper end and a lower end located at the upper end of the linear portion. The first sloping portion is inclined with respect to the linear (Continued)

portion such that the first sloping portion is away from the central axis as extending from the lower end to the upper end of the first sloping portion. The infrared lens contacts the linear portion and the sloping portion of the protruding part.

10 Claims, 7 Drawing Sheets

(56) References Cited

U.S. PATENT DOCUMENTS

| | | | |
|---|---|---|---|
| 2013/0308212 A1* | 11/2013 | Kubala | G02B 7/021 |
| | | | 359/819 |
| 2014/0285671 A1* | 9/2014 | Ishii | H10F 39/806 |
| | | | 348/164 |
| 2015/0070754 A1 | 3/2015 | Kawai | |
| 2018/0321457 A1* | 11/2018 | Symmons | G02B 7/021 |
| 2020/0209549 A1 | 7/2020 | Endo et al. | |
| 2021/0041911 A1 | 2/2021 | Furukawa et al. | |
| 2022/0057596 A1* | 2/2022 | Symmons | B29D 11/00 |

FOREIGN PATENT DOCUMENTS

| | | |
|---|---|---|
| JP | 2013-202894 A | 10/2013 |
| JP | 2020-106735 | 7/2020 |
| JP | 2021-026951 | 2/2021 |

* cited by examiner

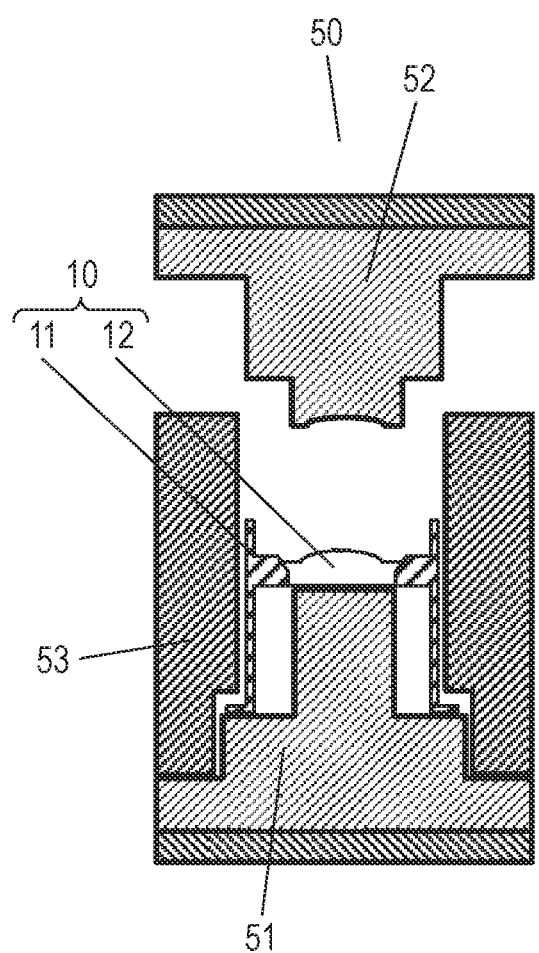

INFRARED LENS UNIT AND INFRARED DETECTION DEVICE

CROSS-REFERENCE TO RELATED APPLICATIONS

This application is a U.S. national stage application of the PCT International Application No. PCT/JP2021/042680 filed on Nov. 19, 2021, which claims the benefit of foreign priority of Japanese patent application No. 2021-034056 filed on Mar. 4, 2021, the contents all of which are incorporated herein by reference.

TECHNICAL FIELD

The present disclosure relates to an infrared lens unit including a lens barrel and an infrared lens supported inside the lens barrel, and to an infrared detection device.

BACKGROUND ART

Generally, a lens unit in which a lens barrel and a glass lens are integrated with each other has a structure where the glass lens is supported by a pressure contact stress from the lens barrel. The lens unit includes a sensor chip, such as a light receiving element, mounted inside the lens barrel so as to be enclosed therein, and undergoes an optical process for the sensor chip and hermetic sealing.

The pressure contact stress from the lens barrel that supports the glass lens is a stress that arises from the difference in the coefficients of linear thermal expansion between the lens barrel and the glass lens when a glass material is press-formed inside the lens barrel.

An infrared lens unit includes an infrared lens corresponding to infrared rays. The glass of the infrared lens is made of chalcogenide glass that transmits infrared rays.

PTL 1 discloses a conventional lens unit.

CITATION LIST

Patent Literature

PTL 1: Japanese Patent Lid-Open Publication No. 2010-156905

SUMMARY

An infrared lens unit includes a lens barrel and an infrared lens supported on the lens barrel. The lens barrel includes a tubular part extending along a central axis extending in upward and downward directions and having an inner circumferential surface surrounding the central axis and a through-hole therein demarcated by the inner circumferential surface, and a protruding part disposed on the inner circumferential surface of the tubular part. The infrared lens is supported by the tubular part via the protruding part. The infrared lens is made of chalcogenide glass. The protruding part includes, in a cross section of the protruding part on a plane on which the central axis extends a linear portion extending in an upward direction from its lower end to its upper end and a sloping portion including an upper end and a lower end located at the upper end of the linear portion. The first sloping portion is inclined with respect to the linear portion such that the first sloping portion is away from the central axis as extending from the lower end to the upper end of the first sloping portion. The infrared lens contacts the linear portion and the sloping portion of the protruding part.

This lens unit allows the infrared lens made of chalcogenide glass to be formed by press-molding.

BRIEF DESCRIPTION OF THE DRAWINGS

FIG. 2C is another schematic view of the press forming apparatus illustrating the method of forming the infrared lens unit according to the embodiment.

DESCRIPTION OF EMBODIMENTS

Figure 1A:
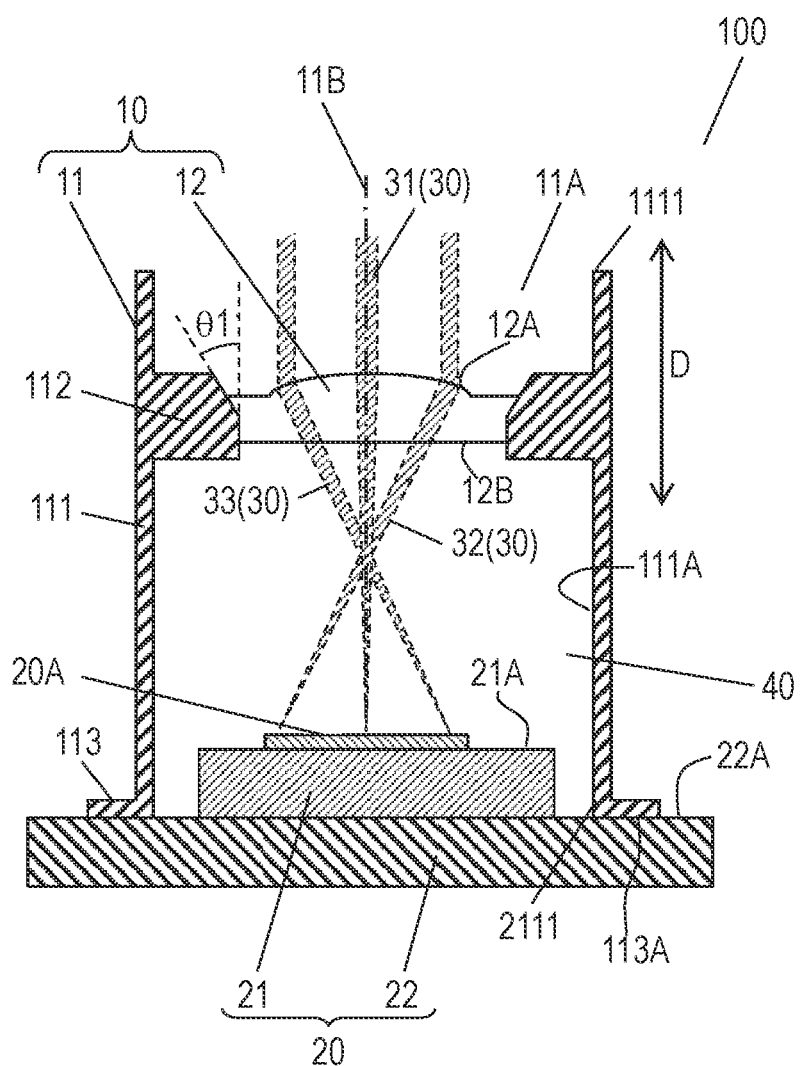
FIG. 1A is a schematic cross-sectional view of an infrared detection device according to an exemplary embodiment of the present disclosure.

An infrared lens unit according to exemplary embodiments of the present disclosure will be described below with reference to the drawings. Note that each of the exemplary embodiments described hereinbelow illustrates a specific example of the present disclosure. Accordingly, the shapes, arrangements, and connections of constituent elements, etc. shown in the following exemplary embodiments are merely examples, and are not intended to limit the present disclosure. Therefore, among the constituent elements in the following exemplary embodiments, those not recited in any one of the independent claims which indicate the broadest concepts of the present disclosure are described as optional elements.

In addition, the drawings are schematic and do not necessarily depict the elements exactly. In the drawings, substantially the same parts are designated by the same reference numerals, and the repetitive description thereof may be omitted or simplified.

Figure 1B:
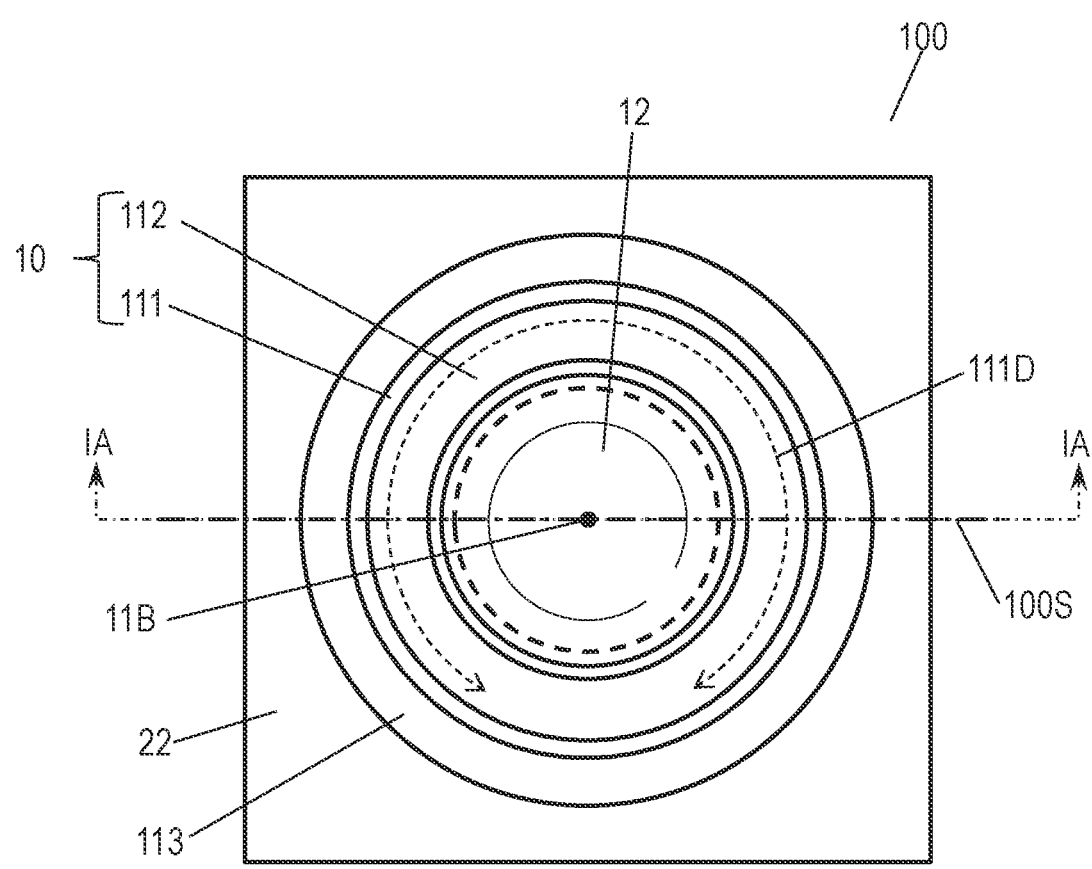
FIG. 1B is a schematic top plan view of the infrared detection device according to the embodiment.

FIGS. 1A and 1B are a cross-sectional view and a top plan view schematically illustrating infrared detection device 100 according to an exemplary embodiment of the present disclosure, respectively. FIG. 1A shows a cross section of infrared detection device 100 taken along line IA-IA shown in FIG. 1B. Infrared detection device 100 includes infrared lens unit 10 and infrared sensor 20. Infrared lens unit 10 includes lens barrel 11 and infrared lens 12. Infrared rays 30 entering infrared lens 12 are focused on light receiving surface 20A of infrared sensor 20. For example, infrared ray 31 entering a central portion of infrared lens 12 focuses at a central portion of light receiving surface 20A. Infrared ray 32 entering a peripheral portion of infrared lens 12 that is on the right of the figure focuses on a left side portion of light receiving surface 20A. Infrared ray 33 entering a peripheral portion of infrared lens 12 that is on the left of the figure focuses on a right side portion of light receiving surface 20A. Note that the dash-dotted line in the figure indicates central axis 11B of through-hole 11A in lens barrel 11. Central axis 11B substantially agrees with the normal line of light receiving surface 20A passing through the center of light receiving surface 20A. In according to this embodiment, upward and downward directions along central axis 11B shown in FIG. 1A are defined as extension direction D. Infrared detection device 100 is configured to detect, for example, the status of a human, the temperature distribution in a room, or the like.

Infrared sensor 20 includes semiconductor chip 21 for detecting infrared rays and base 22. Light receiving surface 20A is disposed on upper surface 21A of semiconductor chip 21. Semiconductor chip 21 is mounted on upper surface 22A of base 22.

Infrared lens unit 10 is mounted on upper surface 22A of base 22. Semiconductor chip 21 is disposed in space 40, which is a closed space surrounded by base 22 and infrared lens unit 10.

Infrared lens unit 10 includes lens barrel 11 that is in a tubular shape and made of metal, and infrared lens 12 that has a light focusing function. Infrared lens 12 is made of chalcogenide glass. Infrared lens 12 is configured to cause infrared rays 30 entering infrared lens 12 from the outside of infrared detection device 100 to focus on light receiving surface 20A of semiconductor chip 21. Infrared lens unit 12 is supported on an inside of lens barrel 11. As illustrated in FIG. 1A, space 40 is formed that is surrounded by infrared lens unit 10 and base 22. Semiconductor chip 21 is disposed inside space 40. An inert gas, such as nitrogen gas, fills space 40, which is a closed space, in order to prevent oxidation of semiconductor chip 21.

Lens barrel 11 includes tubular part 111 having inner circumferential surface 111A and through-hole 11A demarcated by inner circumferential surface 111A, protruding part 112 disposed on inner circumferential surface 111A of tubular part 111 and arranged along circumferential direction 111D (see FIG. 1B) centering about central axis 11B of inner circumferential surface 111A, and flange part 113 disposed at lower end 2111, which is one of the opposite ends (i.e., upper end 1111 and lower end 2111) along extension direction D of tubular part 111. Inner circumferential surface 111A is a cylindrical tubular surface centering about central axis 11B. Inner circumferential surface 111A surrounds central axis 11B and is opposed to central axis 11B. Protruding part 112 has a ring shape extended along inner circumferential surface 111A of tubular part 111, Protruding part 112 will be detailed later. Lower surface 113A of flange part 113 is connected to upper surface 22A of base 22. A protrusion for welding may be provided on lower surface 113A of flange part 113.

Figure 2A:
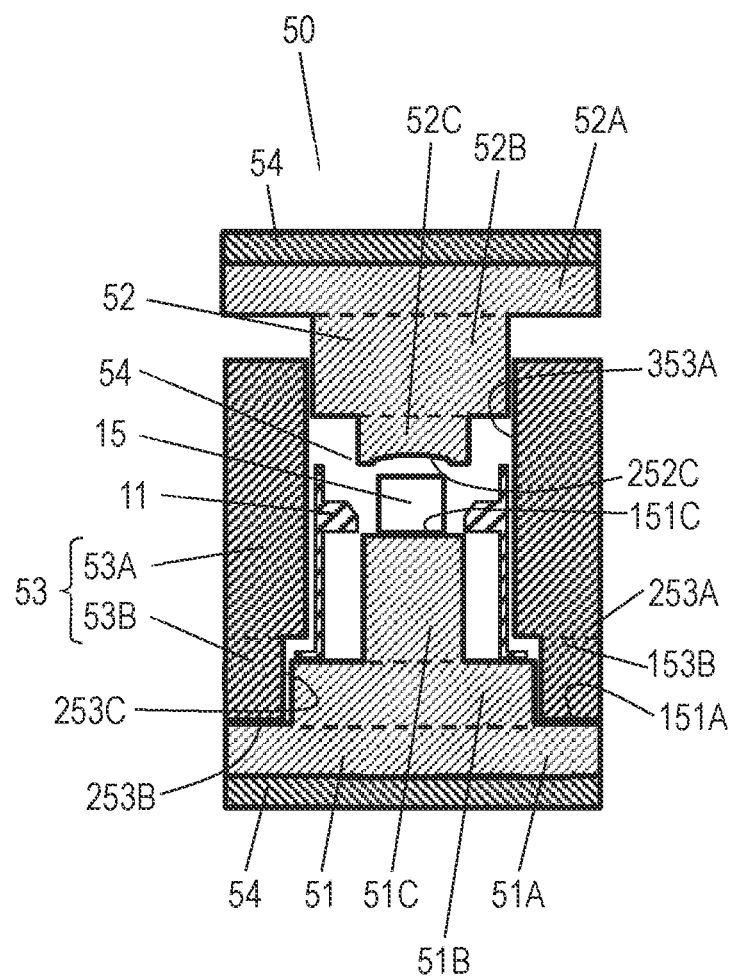
FIG. 2A is a schematic view of a press forming apparatus illustrating a method of forming an infrared lens unit according to the embodiment.
Figure 2B:
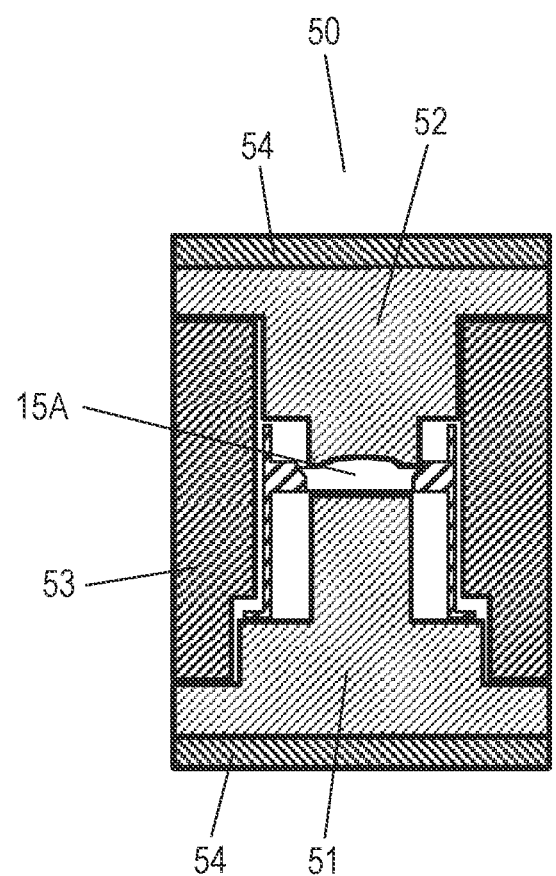
FIG. 2B is another schematic view of the press forming apparatus illustrating the method of forming the infrared lens unit according to an exemplary embodiment.

A method of manufacturing infrared lens unit 10 will be described below. FIGS. 2A, 2B, and 2C are schematic views of press forming apparatus 50 for illustrating the method of manufacturing infrared lens unit 10. Infrared lens 12 of infrared lens unit 10 is press-formed with press forming apparatus 50.

Press forming apparatus 50 includes stationary mold 51, slidable mold 52, and barrel mold 53. Stationary mold 51 has a circular columnar shape including larger diameter portion 51A, middle diameter portion 51B, and smaller diameter portion 51C, which have different diameters. Respective diameters of larger diameter portion 51A, middle diameter portion 51B, smaller diameter portion 51C decrease in this order. Upper surface 151C of smaller diameter portion 51C constitutes a molding surface configured to transfer one of lens surfaces of infrared lens 12 (for example, lower surface 12B of infrared lens 12 shown in FIGS. 2A to 2C). Slidable mold 52 has a circular columnar shaped including larger diameter portion 52A, middle diameter portion 52B, and smaller diameter portion 52C, which have different diameters. Respective diameters of larger diameter portion 52A, middle diameter portion 52B, smaller diameter portion 52C decrease in this order. A molding surface configured to transfer the other one of the lens surfaces of infrared lens 12 (for example, upper surface 12A of infrared lens 12 shown in FIGS. 2A to 2C) is disposed in lower surface 252C of smaller diameter portion 52C. Barrel mold 53 has a cylindrical shape including thick-wall portion 53A and thin-wall portion 53B which have different thicknesses. Thick-wall portion 53A is thicker than thin-wall portion 53B. Lower end 253A of thick-wall portion 53A is connected to upper end 153B of thin-wall portion 53B. Stationary mold 51 is inserted into an opening provided in one end of barrel mold 53. Stationary mold 51 is fixed to barrel mold 53. Lower surface 253B of thin-wall portion 53B contacts upper surface 151A of larger diameter portion 51A. Inner circumferential surface 253C of thin-wall portion 53B contacts outer circumferential surface 451B of middle diameter portion 51B. Slidable mold 52 is inserted into an opening provided in the other end of barrel mold 53. Slidable mold 52 is slidable on barrel mold 53. Inner circumferential surface 353A of thick-wall portion 53A contacts outer circumferential surface 452B of middle diameter portion 52B, thereby allowing barrel mold 53 to function as a sliding guide that restricts a sliding direction of slidable mold 52. Each of stationary mold 51 and slidable mold 52 is provided with temperature controller 54 configured to control the mold temperature in press forming. Temperature controller 54 may be composed of, for example, a known heater block.

The method of manufacturing infrared lens unit 10 will be described below. First, lens barrel 11 and glass material 15 are prepared. Lens barrel 11 may be processed to have a shape including tubular part 111, protruding part 112, and flange part 113 by, for example, cutting a metal. Glass material 15 may be a block glass material formed by molding chalcogenide glass to have a rectangular columnar shape or a spherical glass material formed by molding chalcogenide glass to have a spherical shape. Next, lens barrel 11 and glass material 15 that have been prepared are placed in a mold space that is formed by stationary mold 51, slidable mold 52, and barrel mold 53. Next, the temperature of glass material 15 placed inside press forming apparatus 50 is raised to a temperature equal to or higher than the softening point temperature. After the temperature of glass material 15 reaches a temperature that is able to be press-formed, slidable mold 52 is moved to slide to press glass material 15, thereby deforming glass material 15 to reach a tip end portion of protruding part 112 by presswork and providing press-formed product 15A. After that, press-formed product 15A is cooled until the temperature of press-formed product 15A decreases to a temperature at which press-formed product 15A is removable. After the cooling, slidable mold 52 is removed from barrel mold 53 to remove, from the mold space, infrared lens unit 10 including lens barrel 11 and infrared lens 12 which integrated together.

At the above-mentioned cooling, infrared lens 12 is supported on protruding part 112 of lens barrel 11 due to a stress caused by the difference between linear thermal expansion coefficients of lens barrel 11 and glass material 15. More specifically, infrared lens 12 is supported on lens barrel 11 such that infrared lens 12 is supported on tubular part 111 via protruding part 112. This stress is produced due to the fact that the coefficient of linear thermal expansion of glass material 15 is smaller than the coefficient of linear thermal expansion of lens barrel 11. More specifically, since the amount of shrinkage of glass material 15 is less than the amount of shrinkage of lens barrel 11 during the cooling, lens barrel 11 applies pressure contact stress to press-formed product 15A after the cooling.

Figure 3:
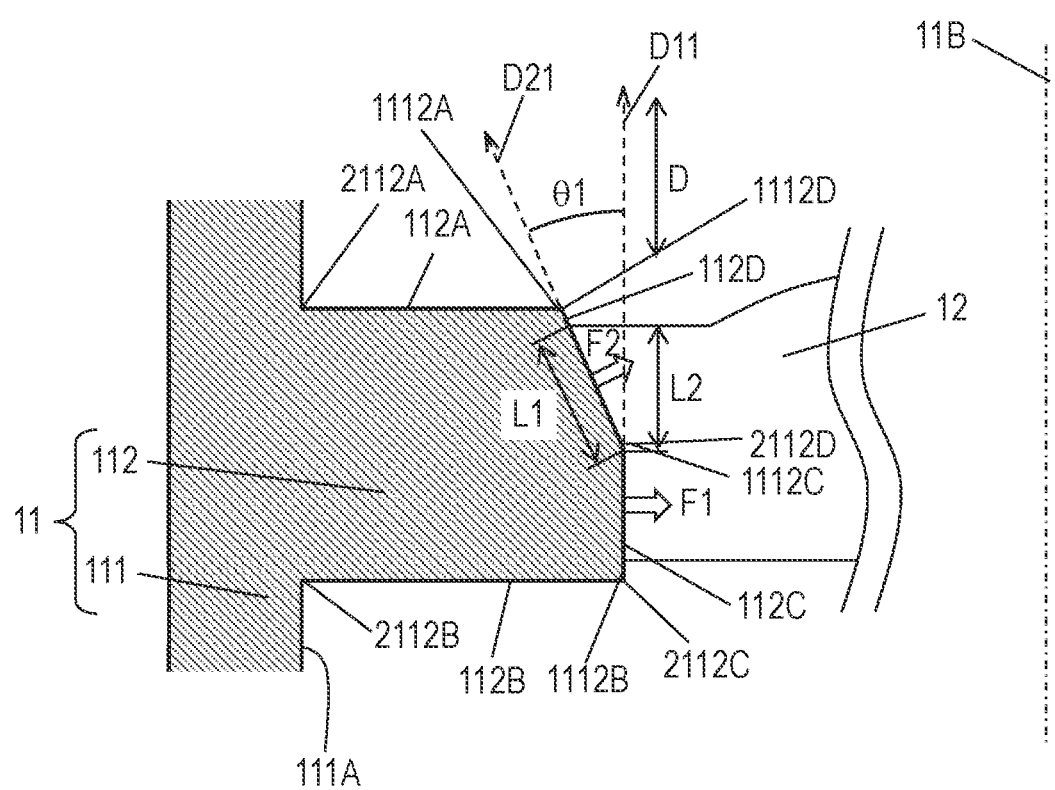
FIG. 3 is an enlarged cross-sectional view of the infrared lens unit according to the embodiment.

Protruding part 112 disposed on lens barrel 11 will be described below. FIG. 3 is a cross-sectional view of infrared lens unit 10 for showing a portion of infrared lens unit 10 around protruding part 112. FIG. 3 shows a cross section of infrared lens unit 10 taken along extension direction D, more specifically, a cross section of protruding part 112 taken along plane 100S on which central axis 11B extends as shown in FIG. 1B. In the just-mentioned cross section, protruding part 112 protrudes from inner circumferential surface 111A of lens barrel 11 toward central axis 11B. In the just-mentioned cross section, protruding part 112 includes upper portion 112A, lower portion 112B, linear portion 112C, and sloping portion 112D. Lower portion 112B faces infrared sensor 20 and is perpendicular to extension direction D. Upper portion 112A faces an opposite side to lower portion 112B and is perpendicular to extension direction D. Linear portion 112C is on an inner circumferential surface of protruding part 112 and extends along extension direction D. Sloping portion 112D is inclined with respect to extension direction D, that is, linear portion 112C. Lower end 2112D which is the inner circumferential end of sloping portion 112D continues to upper end 1112C of linear portion 112C. Upper end 1112D which is the outer circumferential end of the sloping portion 112D continues to inner circumferential end 1112A of upper portion 112A. Linear portion 112C and sloping portion 112D of protruding part 112 contact infrared lens 12. In other words, upper portion 112A and lower portion 112B of protruding part 112 do not contact infrared lens 12.

Specifically, linear portion 112C includes upper end 1112C and lower end 2112C, and extends linearly upward from lower end 2112C to upper end 1112C. Sloping portion 112D includes upper end 1112D and lower end 2112D located at upper end 1112C of linear portion 112C. Sloping portion 112D is inclined with respect to linear portion 112C such that sloping portion 112D becomes away from central axis 11B as extending linearly from lower end 2112D to upper end 1112D. Upper portion 112A includes inner circumferential end 1112A located at upper end 1112D of sloping portion 112D and outer circumferential end 2112A located at inner circumferential surface 111A. Upper portion 112A becomes away from central axis JIB as extending linearly from inner circumferential end 1112A to outer circumferential end 2112A. In accordance with the embodiment, upper portion 112A extends from inner circumferential end 1112A to outer circumferential end 2112A in a direction perpendicular to central axis 11B. Lower portion 112B includes inner circumferential end 1112B located at lower end 2112C of linear portion 112C and outer circumferential end 2112B located at inner circumferential surface 111A. Lower portion 112B becomes away from central axis 11B as extending linearly from inner circumferential end 1112B to outer circumferential end 2112B. In accordance with the embodiment, lower portion 112B extends from inner circumferential end 1112B to outer circumferential end 2112B in a direction perpendicular to central axis 11B. Upper portion 112A and lower portion 112B may not necessarily extend in the direction perpendicular to central axis 11B from inner circumferential ends 1112A and 1112B to outer circumferential ends 2112A and or 2112B, respectively, and they may not necessarily extend linearly. Infrared lens 12 contacts upper end 1112C of linear portion 112C and lower end 2112D of sloping portion 112D of protruding part 112. In accordance with the embodiment, infrared lens 12 do not contact lower end 2112C of linear portion 112C or upper end 1112D of sloping portion 112D of protruding part 112, but infrared lens 12 may contact at least one of lower end 2112C and upper end 1112D.

As shown in FIG. 3, when an the angle formed by direction D11 from lower end 2112C toward upper end 1112C of linear portion 112C and direction D21 from lower end 2112D toward upper end 1112D of sloping portion 112D is defined as θ1, the width of the contact surface of sloping portion 112D contacting infrared lens 12 is defined as L1, and the width extending along extension direction D from lower end 2112D of sloping portion 112D to the upper surface of infrared lens 12 is defined as L2, width L1 is expressed as: L1=L2/cos θ1. That is, sloping portion 112D has the contact surface contacting infrared lens 12. This configuration increases the contact surface area in comparison with a lens unit in which the contact surface is formed only by linear portion 112C. In addition, since the increase of the contact surface area reduces the pressure contact stress per unit area applied from lens barrel 11, accordingly reducing a chipping resulting from press forming. As a result, infrared lens 12 of infrared lens unit 10 made of chalcogenide glass can be formed by press forming.

Chalcogenide glass is more brittle than oxide glass, which is a glass material of a glass lens that is commonly used in press forming. A verification test concerning scratch hardness of glass shows that chalcogenide glass is more brittle than common oxide glass, and the cause is considered to be, for example, that chalcogenide glass has a relatively small binding energy. Due to the brittleness of chalcogenide glass, press forming of an infrared lens unit made of chalcogenide glass has not been developed.

Infrared lens unit 10 according to the exemplary embodiment allows infrared lens 12 made of chalcogenide glass to be formed by press forming, as described above.

The above-mentioned contact surface area can be increased by increasing the angle θ1 formed by sloping portion 112D and extension direction D, i.e., central axis 11B. However, the increase in the contact surface area leads to a decrease in the pressure contact stress between infrared lens 12 and protruding part 112 accordingly. For infrared lens unit 10, a pressure test between the inside of infrared lens 12 in lens barrel 11, i.e., the side toward infrared sensor 20, and the outside of infrared lens 12, i.e., the outside of infrared detection device 100, was conducted to check hermeticity. As a result, it was confirmed that angle θ1 within the range of 20°≤θ1≤35° ensured hermeticity.

As shown in FIG. 3, assuming that the pressure contact stress per unit area of linear portion 112C is F1 and the pressure contact stress per unit area of sloping portion 112D is F2, F2 is expressed as: F1·cos θ1. This means that pressure contact stress F1 per unit area of linear portion 112C is constant irrespective of a change of θ1, the pressure contact stress per unit area of sloping portion 112D changes according to a change of θ1. Therefore, in order to proactively ensure hermeticity in association with a reduction in pressure contact stress of sloping portion 112D, the surface roughness of sloping portion 112D may be preferably greater than the surface roughness of linear portion 112C.

As for the types of chalcogenide glass, sulfide-based chalcogenide glass and selenide-based chalcogenide glass are suitable for the above-described press forming. When sulfide-based chalcogenide glass is used for infrared lens 12, the metal used for lens barrel 11 may be preferably stainless steel, which has a coefficient of linear thermal expansion of $17.3 \times 10^{-6}$, because the linear thermal expansion coefficient of sulfide-based chalcogenide glass is $14 \times 10^{-6}$. For the sulfide-based chalcogenide glass, it is possible to use, for example, ILR-SF2 made by Isuzu Glass Ltd. This sulfide-based chalcogenide glass has a softening point temperature of 276° C., a glass transition temperature of 245° C., and a molding temperature of 300° C. The pressing force may preferably range from 5 KgF to 50 KgF in this case. The temperature at which the press-formed product can be taken out (press release temperature) may be set to 240° C.

When selenide-based chalcogenide glass is used for infrared lens 12, the metal used for lens barrel 11 may be preferably aluminum, which has a linear thermal expansion coefficient of $23.8\times10^{-6}$, or brass, which has a linear thermal expansion coefficient of $19.6\times10^{-6}$ since the linear thermal expansion coefficient of selenide-based chalcogenide glass is $16.2\times10^{-6}$. For the selenide-based chalcogenide glass, it is possible to use, for example, IRG203 made by Hubei New Huaguang Information Materials Co., Ltd. This selenide-based chalcogenide glass has a softening point temperature of 301° C., a glass transition temperature of 266° C., and a molding temperature of 330° C. The pressing force may preferably range from 5 KgF to 50 KgF in this case. The temperature at which the press-formed product can be taken out (press release temperature) may be set to 260° C.

Modified Example

Figure 4:
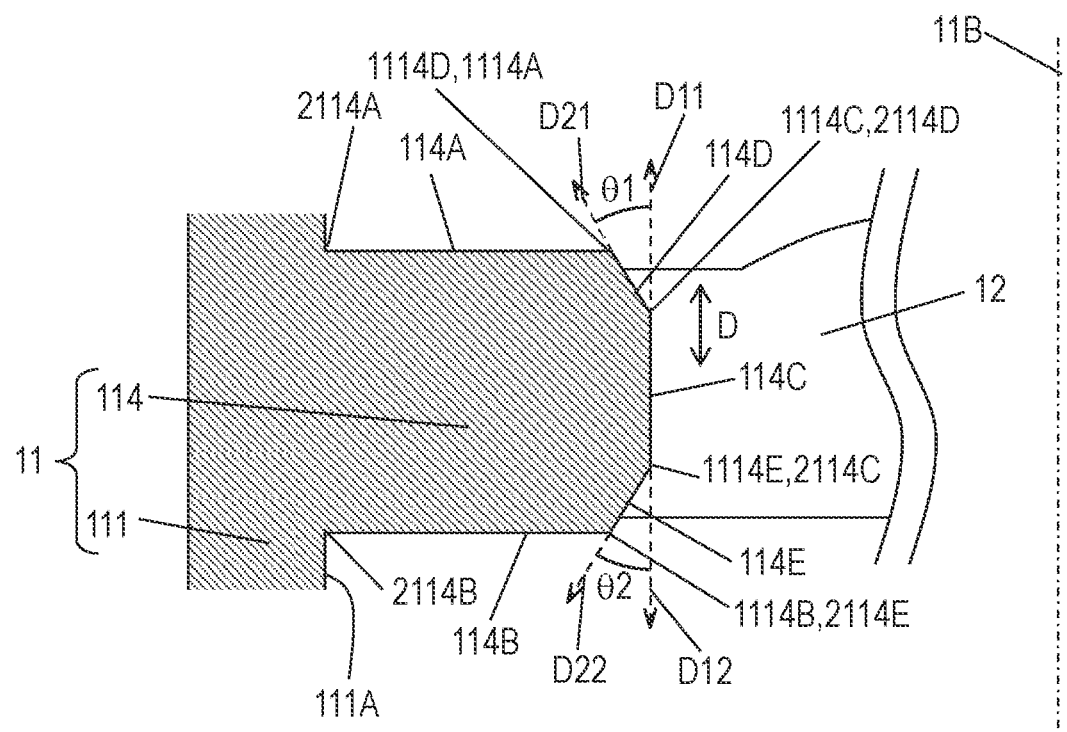
FIG. 4 is an enlarged cross-sectional view of another infrared lens unit according to the embodiment.

FIG. 4 is a cross-sectional view of infrared lens unit 101 of a modified example. In FIG. 4, items in infrared lens unit 10 shown in FIGS. 1A, 1B, and 3 are denoted by the same reference numerals. In place of protruding part 112 of infrared lens unit 10, infrared lens unit 101 includes protruding part 114 disposed on inner circumferential surface 111A of tubular part 111. FIG. 4 is an enlarged view of a portion around the protruding part.

In a cross section of protruding part 114 along extension direction D, protruding part 114 includes upper portion 112A, linear portion 112C, sloping portion 112D, and lower portion 112B, which are like those of protruding part 112, and further includes sloping portion 114E provided between lower portion 112B and linear portion 112C. In other words, protruding part 114 of the modified example includes sloping portion 114D that continues to upper portion 114A and linear portion 114C between upper portion 114A and linear portion 114C, and sloping portion 114E that continues to lower portion 114B and linear portion 114C between lower portion 114B and linear portion 114C. Linear portion 114C, sloping portion 114D, and sloping portion 114E of protruding part 114 contact infrared lens 12. In other words, upper portion 114A and lower portion 114B of protruding part 114 do not contact infrared lens 12. This structure causes infrared lens 12 to sandwich protruding part 112 from above and below so that infrared lens 12 can be prevented from removing off from lens barrel 11. Upper portion 114A and lower portion 114B of protruding part 114 do not contact infrared lens 12.

Specifically, linear portion 114C includes upper end 1114C and lower end 2114C, and extends linearly upward from lower end 2114C to upper end 1114C. Sloping portion 114D includes upper end 1114D and lower end 2114D located at upper end 1114C of linear portion 114C. Sloping portion 114D is inclined with respect to linear portion 114C such that sloping portion 114D becomes away from central axis 11B as extending linearly from lower end 2114D to upper end 1114D. Sloping portion 114E includes lower end 2114E and upper end 1114E located at lower end 2114C of linear portion 114C. Sloping portion 114E is inclined with respect to linear portion 114C such that sloping portion 114E becomes away from central axis 11B as extending linearly from upper end 1114D to lower end 2114D. Upper portion 114A includes inner circumferential end 1114A located at upper end 1114D of sloping portion 114D and outer circumferential end 2114A located at inner circumferential surface 111A. Upper portion 114A becomes away from central axis 11B as extending linearly from inner circumferential end 1114A to outer circumferential end 2114A. In accordance with the embodiment, upper portion 114A extends from inner circumferential end 1114A to outer circumferential end 2114A in a direction perpendicular to central axis 11B. Lower portion 114B includes inner circumferential end 1114B located at lower end 2114E of sloping portion 114E and outer circumferential end 2114B located at inner circumferential surface 111A. Lower portion 114B becomes away from central axis 111B as extending linearly from inner circumferential end 1114B to outer circumferential end 2114B. In accordance with the embodiment, lower portion 114B extends from inner circumferential end 1114B to outer circumferential end 2114B in a direction orthogonal to central axis 11B. Upper portion 114A and lower portion 114B may not necessarily extend in a direction perpendicular to central axis 11B from inner circumferential ends 1114A and 1114B to outer circumferential ends 2114A and 2114B, respectively, and may not extend linearly. Infrared lens 14 contacts upper end 1114C of linear portion 114C, lower end 2114D of sloping portion 114D, and upper end 1114E of sloping portion 114E of protruding part 114. In accordance with the embodiment, infrared lens 14 does not contact lower end 2114E of sloping portion 114E or upper end 1114D of sloping portion 114D of protruding part 114, but infrared lens 12 may contact at least one of lower end 2114E and upper end 1114D.

Angle θ2 formed by direction D12 from upper end 1114C toward lower end 2114C of the linear portion 114C and direction D22 from upper end 114E toward lower end 2114E may preferably be equal to angle θ1 formed by direction D11 from lower end 2114C toward upper end 1114C of linear portion 114C and direction D21 from lower end 2114D toward upper end 1114D of sloping portion 114D. Angle θ1 and angle θ2 within the range $20°≤θ1≤35°$ and the range $20°≤θ2≤35°$ ensure hermeticity. In order to proactively ensure hermeticity in association with a reduction in pressure contact stress of sloping portions 114D and 114E, the surface roughness of sloping portions 114D and 114E may be preferably greater than the surface roughness of linear portion 114C.

The other configurations may provide the same or similar advantageous effects of the infrared detection device in accordance with the embodiment.

In the exemplary embodiments, terms indicating directions, such as "upward and downward directions", "upper end", "lower end", "upper portion", and "lower portion", merely indicate relative directions that depend only on relative positional relationships of structural components, such as a lens barrel and an infrared lens, of the infrared lens unit, and do not indicate absolute directions, such as a vertical direction.

INDUSTRIAL APPLICABILITY

An infrared lens unit according to the present disclosure enables press forming to be used for manufacture and is particularly useful in an infrared detection device that is used in monitoring systems for building air conditioning or the like, in which lower cost is demanded.

REFERENCE MARKS IN THE DRAWINGS 10 infrared lens unit
11 lens barrel 11A through-hole
11B central axis
12 infrared lens
22 base
20 infrared sensor
40 space
100 infrared detection device
112, 114 protruding part
112C, 114C linear portion
112D sloping portion (first sloping portion)
114D sloping portion (first sloping portion)
114E sloping portion (second sloping portion)
D extension direction

The invention claimed is:

1. An infrared lens unit comprising:
a lens barrel including
  a tubular part extending along a central axis extending in upward and downward directions, the tubular part having an inner circumferential surface surrounding the central axis, the tubular part having a through-hole therein demarcated by the inner circumferential surface, and
  a protruding part disposed on the inner circumferential surface of the tubular part, the protruding part having an annular shape extending in a circumferential direction about the central axis; and
an infrared lens supported on the lens barrel such that the infrared lens is supported by the tubular part via the protruding part, wherein
the infrared lens is made of chalcogenide glass,
the protruding part includes, in a cross section of the protruding part on a plane on which the central axis extends:
  a linear portion including an upper end and a lower end extending in an upward direction from the lower end to the upper end; and
  a first sloping portion including an upper end and a lower end located at the upper end of the linear portion, the first sloping portion being inclined with respect to the linear portion such that the first sloping portion is away from the central axis as extending from the lower end of the first sloping portion to the upper end of the first sloping portion, and
the infrared lens contacts the linear portion and the sloping portion of the protruding part.

2. The infrared lens unit according to claim 1, wherein an angle formed by a direction from the lower end of the linear portion toward the upper end of the linear portion and a direction from the lower end of the first sloping portion toward the upper end of the first sloping portion is greater than or equal to 20° and less than or equal to 35°.

3. The infrared lens unit according to claim 1, wherein a surface roughness of the first sloping portion is greater than a surface roughness of the linear portion.

4. The infrared lens unit according to claim 1, wherein:
the infrared lens is made of sulfide-based chalcogenide glass; and
the lens barrel is made of stainless steel.

5. The infrared lens unit according to claim 1, wherein:
the infrared lens is made of selenide-based chalcogenide glass; and
the lens barrel is made of aluminum or brass.

6. The infrared lens unit according to claim 1, wherein the protruding part further includes, in the cross section, a second sloping portion including a lower end and an upper end located at the lower end of the linear portion, the second sloping portion being inclined with respect to the linear portion such that the second sloping portion is away from the central axis as extending from the upper end of the second sloping portion to the lower end of the second sloping portion.

7. The infrared lens unit according to claim 6, wherein an angle formed by a direction from the lower end of the linear portion toward the upper end of the linear portion and a direction from the lower end of the first sloping portion toward the upper end of the first sloping portion is equal to an angle formed by a direction from the upper end of the linear portion toward the lower end of the linear portion and a direction from the upper end of the second sloping portion toward the lower end of the second sloping portion.

8. The infrared lens unit according to claim 7, wherein the infrared lens contacts the linear portion, the first sloping portion, and the second sloping portion of the protruding part.

9. An infrared detection device comprising:
a base;
an infrared sensor disposed on the base; and
the infrared lens unit according to claim 1, the infrared lens unit being disposed on the base, wherein
the infrared sensor is disposed in a space surrounded by the base and the infrared lens unit.

10. The infrared detection device according to claim 9, wherein the space in which the infrared sensor is disposed is surrounded by the base, the infrared lens of the infrared lens unit, and the tubular part of the lens barrel of the infrared lens unit.

* * * * *